US007039737B1

(12) United States Patent
Dorr et al.

(10) Patent No.: US 7,039,737 B1
(45) Date of Patent: May 2, 2006

(54) METHOD AND APPARATUS FOR RESOURCE ARBITRATION

(75) Inventors: Timothy Dorr, Lancaster, MA (US); Stephen Strickland, Marlboro, MA (US)

(73) Assignee: EMC Corporation, Hopkinton, MA (US)

( * ) Notice: Subject to any disclaimer, the term of this patent is extended or adjusted under 35 U.S.C. 154(b) by 179 days.

(21) Appl. No.: 10/735,238

(22) Filed: Dec. 12, 2003

(51) Int. Cl.
 *G06F 12/00* (2006.01)
(52) U.S. Cl. .................................... 710/240; 710/244
(58) Field of Classification Search ............... 710/240
 See application file for complete search history.

(56) References Cited

U.S. PATENT DOCUMENTS

| 5,935,205 A | * | 8/1999 | Murayama et al. | ......... 709/216 |
| 6,567,983 B1 | * | 5/2003 | Shiimori | ...................... 725/105 |
| 6,575,783 B1 | * | 6/2003 | Wu | .......................... 439/540.1 |
| 2002/0057711 A1 | * | 5/2002 | Nguyen et al. | ............. 370/462 |

* cited by examiner

*Primary Examiner*—Rehana Perveen
*Assistant Examiner*—Jeremy S. Cerullo
(74) *Attorney, Agent, or Firm*—McGuinness & Manaras LLP

(57) ABSTRACT

A method and apparatus is described for controlling accesses to a shared resource. An arbitration mechanism uses a register, accessible by each device sharing the resource. The register may be written by the device to request access to the resource, and read by the device to determine whether access to the resource has been granted. Advantageously, the register includes an override bit, which may be used by either device to override the peer device's request for the shared resource. In addition, the register includes a reset bit that may be used to reset arbitration logic controlling the access to the shared logic. The register is used by a straightforward arbitration mechanism that includes only IDLE and GRANT states for each device coupled to the shared resource. Such an arrangement provides a low cost method of controlling accesses to a shared resource.

9 Claims, 3 Drawing Sheets

34 Mux Control Registers

17 ⎯

| Bit # | D3 | D2 | D1 | D0 |
|---|---|---|---|---|
| | | | | 32 |
| Bit Name (Read) | 38 | 36 | 34 | |
| | m_reset_n | Grant | peer_req | req |
| Bit Name (Write) | m_reset_n | N/A | mux_x_ovrd | req |

27 ⎯

| Bit # | D3 | D2 | D1 | D0 |
|---|---|---|---|---|
| Bit Name (Read) | m_reset_n | Grant | peer_req | req |
| Bit Name (Write) | m_reset_n | N/A | mux_x_ovrd | req |

Figure 2

METHOD AND APPARATUS FOR RESOURCE ARBITRATION

FIELD OF THE INVENTION

This invention relates generally to a method and apparatus for allocating resource use among a number of coupled devices.

BACKGROUND OF THE INVENTION

High availability systems are systems in which many of the processing components (and data paths) are replicated. In the event of a single point of failure in one component, the other component of the pair assumes the tasks of its failed partner. High availability paths therefore provide a measure of security in a system environment without the cost of providing a fully redundant system. However, because the high availability system is not fully redundant, certain resources are shared by the component pairs. It is therefore desirable to identify a straightforward method for controlling access to a shared resource.

SUMMARY OF THE INVENTION

According to one aspect of the invention, an arbiter for controlling access to a shared resource by at least two devices includes a set of control bits for each of the at least two devices, each set of control bits accessible by the associated one of the at least two devices, and including a request bit and a grant bit. The arbiter also includes arbitration logic, coupled to the set of control bits, for controlling access to the shared resource, the arbitration logic operating responsive to the request bits for each of the at least two devices to set the grant bit of one of the at least two devices according to an arbitration protocol.

According to another aspect of the invention, a method for controlling access to a shared resource by at least two devices includes the steps of selecting, responsive to a set of control bits associated with at least two devices coupled to the shared resource, one of the at least two devices for access to the shared resource, wherein the set of control bits includes a request bit and a grant bit for each one of the at least two devices.

According to a further aspect of the invention, a method for controlling access to a shared resource among a first device and a second device includes an arbitration process having a first device idle state, a first device grant state, a second device idle state and a second device grant state. The method including the steps of the first device requesting access to the shared resource, granting access to the first device and transitioning the arbitration process from a first device idle state to a first device grant state in response to the first device requesting access to the shared resource, indicating, by the first device, that it has completed use of the resource; and transitioning the arbitration process from the first device grant state to the first device idle state in response to the indication from the first device that it has completed use of the shared resource.

BRIEF DESCRIPTION OF THE DRAWINGS

FIG. 2 is a block diagram of mux control registers that may be used to control access to the shared resource of FIG. 1.

DESCRIPTION OF VARIOUS EMBODIMENTS

Figure 1:
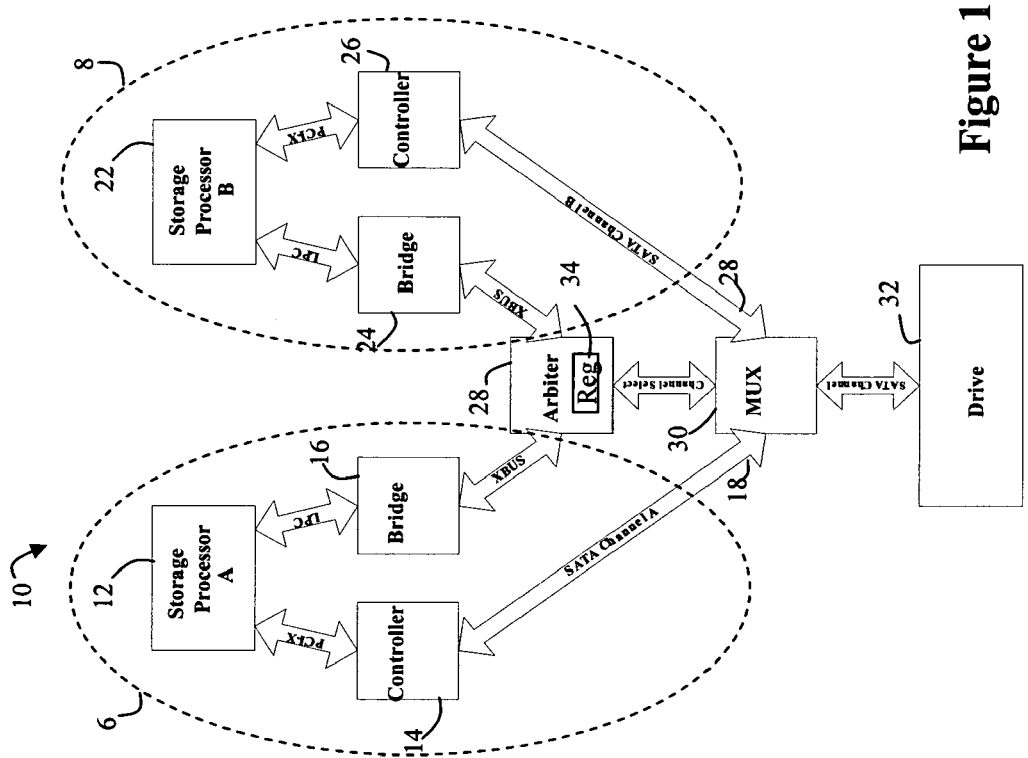
FIG. 1 is a block diagram illustrating a shared resource environment in which the present invention may be implemented.

FIG. 1 illustrates several components that may be included in a high availability networked storage environment incorporating the present invention. In FIG. 1, two data paths 6 and 8 share access to a resource 32 via mux 30. In one embodiment, the resource 32 is an array of data disks, although the present invention may be used to control access to any resource.

In the embodiment of FIG. 2, each data path includes a storage processor 12, 22, a controller 14, 24 and a bridge 16, 26. The Storage Processors (SPs) each signal their associated controller to provide access commands for accessing the shared resource 32. In addition, the storage processors 12, 22 are coupled to bridges 16, 26, respectively. The bridges 16 and 26 each are coupled to an Arbiter 28. In response to resource associated requests from the bridges, the arbiter 28 signals mux 30 to couple either the first data path 6 or the second data path 8 to the resource 32. Thus, the Arbiter is used to decide which data path input is to be output from the mux 30.

According to one embodiment of the invention, the drives 32 are Serial AT Attached (SATA) drives, and the controller 14 and 26 and mux 30 are SATA specific devices. That is, the controller 14 and 26 provides control signals to control the serial transfer of data to and from the SATA drives. Exemplary components that may be used for the controller 14 and 26 are the Marvell 88SX5080 and mux 30 are the ServerWorks SWC-IB7452-P01. The arbitration functionality of the Arbiter 28 may be provided by, for example, a Xilinx XC9572XL PLD. However, it should be understood that the present invention is not limited to any particular type of data transfer (serial or parallel), or the use of any particular components.

Multiple instances of the arbitration functionality of Arbiter 28 may be contained in an exemplary component. For example, a single Xilinx XC9572XL PLD may contain four Arbiters for connecting to four different drive resources 32. In addition, multiple exemplary components may be used to provide more drive resources 32 for data paths 6 and 8. Data paths, 6 and 8 are designed such that if any of the exemplary components containing the Arbiters 28 fail, communication to the other exemplary components shall still be operable. The total system is design such that if any exemplary component containing one or more Arbiters 28 fail, no data or access to data is lost. According to one aspect of the invention, Arbiter 28 includes a set of mux control registers 34 which store information regarding a current arbitration state for the mux 30. Each storage processor may write to bits of the mux control registers to request access to the mux, override a peers request for the mux, or reset the mux. In addition, each storage processor can read the values of the bits of the mux control register 34 to determine whether the respective SP has gained control of the mux.

Referring now to FIG. 2, the mux control register set is shown to include two four bit registers 17 and 27, both of which may be accessed by the Arbiter 28. In this exemplary embodiment, register 17 is also accessible by SP 12, and register 27 is also accessible by SP 22. As mentioned each register includes four bits, which may be read when the SP wishes to determine the state of the Arbiter, or which may be written to when the SP wishes to change the state of the Arbiter, to gain access to the shared resource. In some instances, as will be described below, the bits have different meanings to the arbitration logic depending upon whether they are written by the SP or by the Arbiter. Although the registers 17 are shown having certain bits mapped to certain locations, the present invention is not limited to any particular mapping of bits in the registers. In addition, although two separate registers are shown, it is easily appreciated that the data may be stored in any format that maps the bits to the storage processors, and thus the use of two distinct registers is not required.

In general, each register stores a request bit 32, a peer request bit 34, a grant bit 36 and a reset bit 38. The request bit 32 is written by the associated SP to indicate to the Arbiter 28 that the SP seeks access to the mux, and therefore the shared resource. It may also be read by the SP to verify that the Arbiter has received the request. The peer request bit 34 is written by the Arbiter when the peer SP wants to request access to the mux. This value may be read by the associated SP to determine whether the peer device has access to the mux. The SP may additionally write to this bit, the effect being to override the grant to the peer, and gain access to the mux by the SP. Although for simplicity of storage registers the override and peer request bits are here shown mapped to a common bit in the register, it is understood that they may also be provided as independent registers. The grant bit 36 is written by the Arbiter 28 to indicate to the SP that it has been grated access to the mux/resource. The reset bit 38 may be written to and read by an SP to reset the mux, in the event that the SP detects unpredictable behavior from the mux.

Although the above mux control bits have been described, the present invention is not limited to just these bits. For example a test bit may be used for each register for the purposes of testing the read and write paths of the registers. When the test bits are set, the Arbiter will not transition to any new states. Thus it should be understood that the present invention is not limited to an arbitration mechanism including only the described mux control bits, but rather may be used in any system that includes at least those bits.

Figure 3:
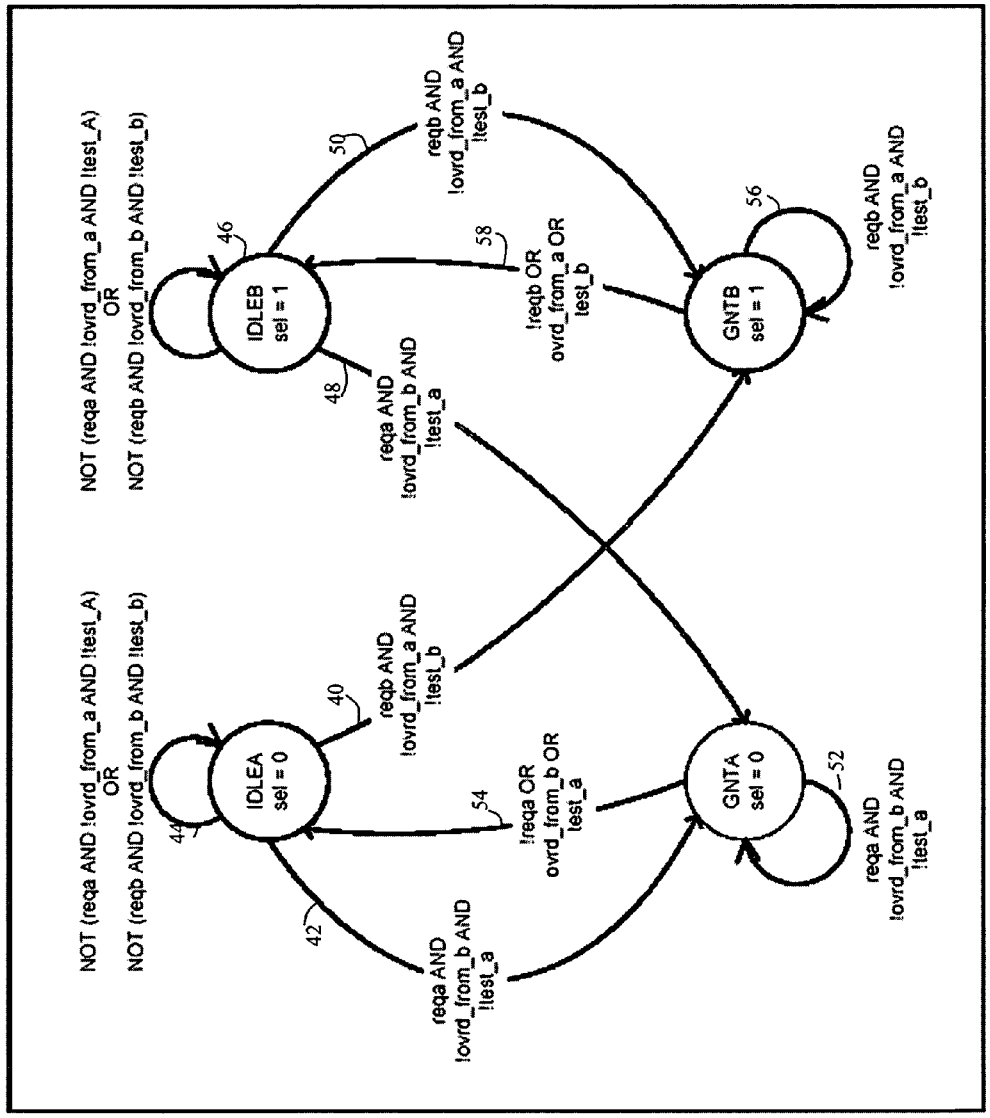
FIG. 3 is a state diagram illustrating one embodiment of a process that uses values of the bits in the registers of FIG. 2 to control access to the shared resource of FIG. 1.

Referring now to FIG. 3, a state diagram of an exemplary arbitration process of the present invention is shown to include four states, IDLE A, IDLE B, GRANT A and GRANT B. In general, in IDLE A state SP A (in this case, SP 12), has control. over the mux/shared resource, although there are no outstanding requests for the resource from either SP. In one embodiment, the IDLE A state is an initial state of the Arbiter. Similarly, IDLE B state means that SP B (in this case SP 22) has control over the shared mux/shared resource, although there are no outstanding requests for the resource by either SP. In GRANT A state, SP A 12 issued a request for access to the mux/resource, and the Arbiter granted the request. Similarly, in GRANT B state, the SP B 22 issued a request for access to the mux/resource, and the Arbiter granted the request.

FIG. 3 illustrates various transitions between the states in response to the setting of different values of the registers by the two SPs. For example, when in state IDLE A, the Arbiter will remain in IDLE A via path 44 while there is no request from either SP A or SP B, the override bit is not set by SP B, or while any test bits are set. The Arbiter will transition from state IDLE A to Grant A if the request bit 32 of register 17 is set by SP A, and the override bit 34 is not set in register 27 by SP B (and the SP A test bit is not set). Alternatively, the Arbiter will transition from IDLE A state to Grant B state if the request bit 32 of register 27 is set by SP B, and the override bit 34 is not set in register 17 by SP A (and the SP B test bit is not set). In Grant state, the Arbiter writes the grant bit 36 of the 'winning' SP register, indicating to the SP that it has gained access to the mux/resource and enabling the SP to begin its access.

Once the Arbiter is in either Grant A or Grant B state, it will stay in the state until the associated SP indicates that it has finished with the resource or the peer SP overrides it. The SP indicates that it has completed its work with the resource by clearing the request bit 32 in its associated register. If the Arbiter is in Grant A state and SP A clears the request bit, then the Arbiter transitions to IDLE A state. Similarly, if the Arbiter is in Grant B state and SP B clears the request bit, then the Arbiter transitions to IDLE B state. With such an arrangement, the SP which had previously had access to the mux/resource retains control of the resource until the peer device issues a request. If the peer device writes to the request register while the working device is using the resource, the Arbiter 28 sets the peer_req bit 34 in the register of the working device. The working device can then determine whether it wishes to give control of the resource to the peer device when it has completed is work, or whether it wishes to override the peer request to continue work of higher priority. When the working device finishes with the shared resource, the Arbiter transitions back to the IDLE state associated with the working device (on either path 54 or 58), and then, if the peer device still has a request pending, the Arbiter transitions to the grant state for the peer device. The peer SP can also override the SP that is using the resource, for instance if the SP that had the resource failed.

Thus a method and apparatus has been shown and described for controlling accesses to a shared resource. The arbitration mechanism uses a register, accessible by each device sharing the resource. The register may be written by the device to request access to the resource, and read by the device to determine whether access to the resource has been granted. Advantageously, the register includes an override bit, which may be used by either device to override the peer device's request for the shared resource. In addition, the register includes a reset bit that may be used to reset the mux controlling the access to the shared resource. The register is used by a straightforward arbitration mechanism that includes only IDLE and GRANT states for each device coupled to the shared resource. Such an arrangement provides a low cost method of controlling accesses to a shared resource. Although the above embodiment has been described with regard to high availability systems, it is readily apparent that the concepts described above could be used in any scenario where two or more devices require access to a shared resource. Although various embodiments have been described, the invention is not to be limited by the specific embodiments described herein, but rather by the spirit and scope of the claims appended hereto.

What we claim is:

1. An arbiter for controlling access to a shared resource by at least two devices, the arbiter including:

a set of control bits for each of the at least two devices, each set of control bits accessible by the associated one of the at least two devices, and including a request bit and a grant bit;

arbitration logic, coupled to the sets of control bits, for controlling access to the shared resource, the arbitration logic operating responsive to the request bits for each of the at least two devices to set the grant bit of one of the at least two devices according to an arbitration protocol, wherein the set of control bits further includes an override bit for enabling a first one of the at least two devices to take control of the shared resource away from a second one of the at least two device.

2. The arbiter of claim 1, wherein the arbitration protocol includes an IDLE state and a GRANT state for each one of the at least two devices, and wherein transitions are made between the IDLE states and the GRANT states in response to the set of control bits.

3. An arbiter for controlling access to a shared resource by at least two devices, the arbiter including:
   a set of control bits for each of the at least two devices, each set of control bits accessible by the associated one of the at least two devices, and including a request bit and a grant bit;
   arbitration logic, coupled to the sets of control bits, for controlling access to the shared resource, the arbitration logic operating responsive to the request bits for each of the at least two devices to set the grant bit of one of the at least two devices according to an arbitration protocol, wherein the arbiter further includes a mux, coupled between the at least two devices and the shared resource and wherein the set of control bits further includes a reset bit for resetting the mux.

4. The arbiter of claim 3, wherein the shared resource is a disk drive, and wherein the mux is coupled between the at least two devices and the disk drive, wherein each of the at least two devices provides input signals to the mux, and wherein the arbitration logic controls selection of the mux to thereby control access to the disk drive by the at least two devices.

5. The arbiter of claim 4, farther comprising at least two controllers, each one of the at least two controllers disposed between a corresponding one of the at least two devices and the mux, each controller providing signals for controlling operation of the disk drive.

6. The arbiter of claim 5, wherein the disk drive is a Serial AT Attached (SATA) disk drive, the controller is a SATA controller and the mux is a SATA mux.

7. A method for controlling access to a shared resource by at least two devices, the method including the steps of
   selecting, responsive to a set of control bits associated with at least two devices coupled to the shared resource, one of the at least two devices for access to the shared resource, wherein the set of control bits includes a request bit and a grant bit for each one of the at least two devices; and
   a first one of the at least two devices taking control of the shared resource away from a second one of the at least two devices by setting an override bit associated with the first one of the at least two devices.

8. The method according to claim 7, further including the steps of granting access to at least one of the devices by setting the grant bit associated with the at least one of the devices, in response to the request bit associated with the at least one of the devices being set.

9. A method for controlling access to a shared resource among a first device and a second device, the method including an arbitration process having a first device idle state, a first device grant state, a second device idle state and a second device grant state, the method including the steps of:
   the first device requesting access to the shared resource;
   granting access to the first device and transitioning the arbitration process from a first device idle state to a first device grant state in response to the first device requesting access to the shared resource and an override bit that enables the first device to control the shared resource.

\* \* \* \* \*